(12) United States Patent
Elgala et al.

(10) Patent No.: US 9,621,268 B2
(45) Date of Patent: Apr. 11, 2017

(54) OPTICAL ORTHOGONAL FREQUENCY DIVISION MULTIPLEXING (O-OFDM) SYSTEM WITH PULSE-WIDTH MODULATION (PWM) DIMMING

(71) Applicant: Trustees of Boston University, Boston, MA (US)

(72) Inventors: Hany Elgala, Chestnut Hill, MA (US); Thomas Little, Newton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 14/894,089

(22) PCT Filed: Jun. 24, 2014

(86) PCT No.: PCT/US2014/043820
§ 371 (c)(1),
(2) Date: Nov. 25, 2015

(87) PCT Pub. No.: WO2015/047497
PCT Pub. Date: Apr. 2, 2015

(65) Prior Publication Data
US 2016/0134366 A1   May 12, 2016

Related U.S. Application Data

(60) Provisional application No. 61/840,649, filed on Jun. 28, 2013.

(51) Int. Cl.
*H04B 10/00* (2013.01)
*H04B 10/04* (2006.01)
(Continued)

(52) U.S. Cl.
CPC ........ *H04B 10/116* (2013.01); *H04L 25/4902* (2013.01); *H04L 27/2627* (2013.01); *H04L 27/2697* (2013.01)

(58) Field of Classification Search
CPC ............................ H04B 10/116; H04B 10/524
(Continued)

(56) References Cited

U.S. PATENT DOCUMENTS 6,548,967 B1 * 4/2003 Dowling ............ G06Q 30/0201
315/307
7,961,798 B2 * 6/2011 Jun ..................... H04L 27/2608
370/499
(Continued)

FOREIGN PATENT DOCUMENTS

WO     WO 2011-067103 A1     6/2011

OTHER PUBLICATIONS

Elgala. H, Reverse Polarity O-OFDM dimming compatible OFDM for gigabit VLC links, Jul. 8, 2013, Optics Express, vol. 21, Issue 20.*
(Continued)

*Primary Examiner* — David Payne
*Assistant Examiner* — Pranesh Barua
(74) *Attorney, Agent, or Firm* — Iandiorio Teska & Coleman, LLP

(57) ABSTRACT

An optical orthogonal frequency division multiplexing (O-OFDM) system with pulse-width modulation (PWM) dimming includes a driver responsive to one or more predetermined dimming set points configured to generate PWM signals having a predetermined duty cycle and configured to supply current to one or more light emitting diodes (LEDs). An O-OFDM generator responsive to the one or more predetermined dimming set points and digital data is configured to generate digital inverted O-OFDM signals during on-states of the PWM signals and non-inverted O-OFDM signals during off-states of the PWM signals according to the predetermined duty cycle and convert the digital inverted O-OFDM signals and the digital non-inverted O-OFDM
(Continued)

signals to analog output O-OFDM signals. A combiner circuit responsive to the current from the driver and the analog output O-OFDM signals is configured such that the analog output O-OFDM signals modulate the current to the one or more LEDs to provide a high capacity visible light communication link

21 Claims, 12 Drawing Sheets

(51) Int. Cl.
*H04B 10/06* (2006.01)
*H04B 10/116* (2013.01)
*H04L 25/49* (2006.01)
*H04L 27/26* (2006.01)

(58) Field of Classification Search
USPC .............. 398/191, 183, 182, 212, 187, 130
See application file for complete search history.

(56) References Cited

U.S. PATENT DOCUMENTS

| | | | |
|---|---|---|---|
| 2007/0058987 A1* | 3/2007 | Suzuki | H04B 10/116 398/183 |
| 2009/0214225 A1* | 8/2009 | Nakagawa | H04B 10/1149 398/191 |
| 2010/0073995 A1* | 3/2010 | Tran | B82Y 10/00 365/151 |
| 2010/0209118 A1* | 8/2010 | Takene | H04B 10/116 398/182 |
| 2010/0247112 A1* | 9/2010 | Chang | H04B 10/1149 398/182 |
| 2011/0115395 A1 | 5/2011 | Barrow et al. | |
| 2011/0181196 A1 | 7/2011 | Kang et al. | |
| 2012/0045219 A1* | 2/2012 | Langer | H04B 10/1141 398/182 |
| 2013/0028612 A1* | 1/2013 | Ryan | G01S 1/70 398/172 |
| 2013/0084078 A1* | 4/2013 | Cunningham | H04B 10/541 398/183 |
| 2014/0308048 A1* | 10/2014 | Roberts | H04L 27/10 398/187 |
| 2015/0304030 A1* | 10/2015 | Sung | H04B 10/116 398/118 |

OTHER PUBLICATIONS

Rahaim, Michael, Wireless Access Test-bed through visible light and Dimming compatible OFDM, 2015 Wireless Communication and Networking Conference, Track 4.*

Stefan, et al., "Study of Dimming and LED Nonlinearity for ACO-OFDM Based VLC Systems", IEEE 2012, Wireless Communications and Networking Conference: PHY and Fundamentals, pp. 990-994.

* cited by examiner

OPTICAL ORTHOGONAL FREQUENCY DIVISION MULTIPLEXING (O-OFDM) SYSTEM WITH PULSE-WIDTH MODULATION (PWM) DIMMING

RELATED APPLICATIONS

This application hereby claims the benefit of and priority to U.S. Provisional Patent Application Ser. No. 61/840,649, filed on Jun. 28, 2013, under 35 U.S.C. §§119, 120, 363, 365, and 37 C.F.R. §1.55 and §1.78, which is incorporated by reference herein.

GOVERNMENT RIGHTS

This invention was made with U.S. Government support under Contract No. EEC-0812056, awarded by the National Science Foundation. The Government has certain rights in certain aspects of the subject invention.

FIELD OF THE INVENTION

This invention relates to an optical orthogonal frequency division multiplexing (O-OFDM) system with pulse-width modulation (PWM) dimming.

BACKGROUND OF THE INVENTION

Visible light communications (VLC) technology provides for the exploration of light emitting diode (LED) luminaires to provide illumination and high capacity data transfer simultaneously. VLC is an advantageous form of data communication because it provides high data rates with low power requirements, has an unregulated bandwidth, has no interference with radio frequency (RF) systems, is low cost, and has no known health concerns. In VLC, the data wave form is modulated onto the instantaneous power of the optical carrier and an optical detector generates a current proportional to the received instantaneous power, often referred to as intensity modulation with direct detection (IM/DD).

Commercially available LED luminaires may be used to provide light to illuminate a space, such as a room or office, and the like, and provide the light needed for VLC. Dimming the LED luminaires is an essential feature in lighting to meet both functional and aesthetic requirements of a space. Dimming also conserves energy and expands the life span of the LED light sources used in the luminaire. The brightness, or dimming, of an LED may be adjusted by controlling the forward current through the LED. There are several known techniques to dim LEDs. These include analog dimming, digital dimming, and hybrid dimming. Analog dimming, also known as amplitude modulation (AM), or continuous current reduction, is a simple type of dimming control. This method reduces the current amplitude linearly to adjust the radiated optical flux. Digital dimming relies on the average duty cycle or signal density which represents the equivalent analog dimming level, e.g., a digitally modulated pulse train drives the LED at a constant current. Pulse-width modulation (PWM) is the simplest example of digital dimming. PWM relies on a fixed period of the PWM signal and adjusting the duty cycle proportionally to the required dimming percentage. PWM reduces light intensity more linearly and induces less of a chromaticity shift than AM. Hybrid dimming is a combination of AM and PWM which further reduces chromaticity shifts.

Optical orthogonal frequency division multiplexing (O-OFDM) is a promising parallel data transmission technique used in VLC where high data rates can be achieved by transmitting orthogonal subcarriers. O-OFDM systems do not require complex channel equalizers, the time varying channel can be easily estimated using frequency domain channel estimation, and adaptive modulation can be applied based on the up-link/down-link requested data rates.

Conventional systems and methods to combine O-OFDM signals with PWM dimming signals typically rely on superimposing O-OFDM signals onto the PWM dimming signal only while the PWM signal is high or during the on-state. Such a design is limited by the relatively low PWM line rate and results in a low capacity VLC link.

Thus, there is a need to combine the high data rates available with fast O-OFDM communication signals to provide a high capacity VLC link while maintaining a wide dimming range using commercially available LED luminaires which use relatively slow PWM dimming signals.

BRIEF SUMMARY OF THE INVENTION

In one aspect, an optical orthogonal frequency division multiplexing (O-OFDM) system with pulse-width modulation (PWM) dimming is featured. The system includes a driver responsive to one or more predetermined dimming set points configured to generate PWM signals having a predetermined duty cycle and configured to supply current to one or more light emitting diodes (LEDs). An O-OFDM generator responsive to the one or more predetermined dimming set points and digital data is configured to generate digital inverted O-OFDM signals during on-states of the PWM signals and non-inverted O-OFDM signals during off-states of the PWM signals according to the predetermined duty cycle and convert the digital inverted O-OFDM signals and the digital non-inverted O-OFDM signals to analog output O-OFDM signals. A combiner circuit responsive to the current from the driver and the analog output O-OFDM signals is configured such that the analog output O-OFDM signals modulate the current to the one or more LEDs to provide a high capacity visible light communication link.

In one embodiment, the O-OFDM generator may include an inverter configured to generate the digital inverted O-OFDM signals during the on-states based on the predetermined duty cycle. The O-OFDM generator may include a digital-to-analog converter for converting the digital inverted O-OFDM signals and the digital non-inverted O-OFDM signals to the analog O-OFDM signals. The combiner circuit may include at least one amplifier transistor configured such that the analog output O-OFDM signals modulate the current to the one or more LEDs to provide a high capacity visible light communication link. The combiner circuit may include at least one amplifier transistor and at least one switching transistor configured such that the analog output O-OFDM signals modulate the current to the one or more LEDs to provide a high capacity visible light communication link. The digital inverted O-OFDM signals may include a steam of O-OFDM symbols. The digital non-inverted O-OFDM signals may include a steam of O-OFDM symbols. The inverter may be configured to invert a predetermined number of O-OFDM symbols based on the predetermined duty cycle. The inverter may be configured to invert a predetermined number of O-OFDM symbols based on duration of the on-states. The O-OFDM generator may be configured to generate unipolar inverted O-OFDM symbols during the on-states. The O-OFDM generator may be configured to generate unipolar non-inverted O-OFDM symbols during the off-states. The one or more LEDs may be integrated with a luminaire.

In another aspect, an optical orthogonal frequency division multiplexing (O-OFDM) method with PWM dimming is featured. The method includes providing one or more predetermined dimming set points and digital data. In response to the one or more predetermined dimming set points, PWM signals are generated having a predetermined duty cycle. In response to the predetermined duty cycle and the digital data, digital inverted O-OFDM signals are generated during on-states of the PWM signals and non-inverted O-OFDM signals are generated during off-states of the PWM signals. The digital inverted O-OFDM signals and the digital non-inverted O-OFDM signals are converted to analog output O-OFDM signals. The current to the one or more LEDs is modulated using the analog output O-OFDM signals to provide a high capacity visible light communication link.

In one embodiment, generating the digital inverted O-OFDM may include generating the digital inverted O-OFDM signals during the on-states based on the predetermined duty cycles. Generating the digital inverted O-OFDM signals may include generating a steam of O-OFDM symbols. Generating digital non-inverted O-OFDM signals may include generating a steam of O-OFDM symbols. A predetermined number of O-OFDM symbols are inverted during the on-states based on the predetermined duty cycle. A predetermined number of O-OFDM symbols are inverted during the on-states based on the duration of the on-states. The method may include generating unipolar inverted O-OFDM symbols during the on-states. The method may include generating unipolar non-inverted O-OFDM symbols during the off-states. The one or more LEDs may be integrated with a luminaire.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
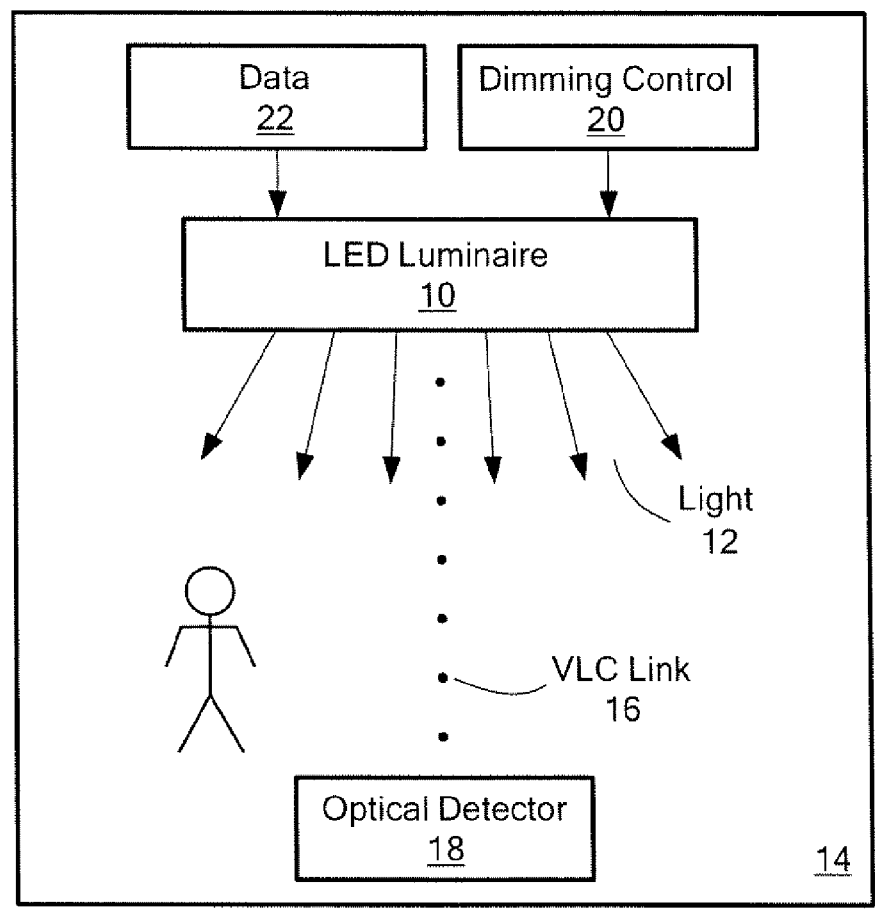
FIG. 1 is a schematic block view showing an LED luminaire which may be used to provide light to illuminate a space and provide a VLC link.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer, As discussed in the Background section above, commercially available LED luminaire 10, FIG. 1, may be used to provide light 12 to illuminate room 14 and also encode data to provide VLC communication link 16 which is decoded by optical detector 18. To control and dim light 12 emitted from LED luminaire 10, dimming control 20 is input into LED luminaire 10. To provide VLC, digital data 22 is also input into LED luminaire 10 and data wave forms are modulated onto the instantaneous power of light 12 emitted from LED luminaire 10.

Figure 2:
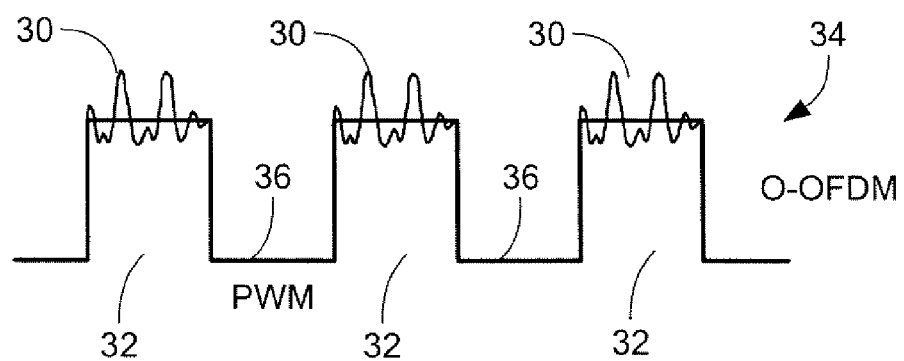
FIG. 2 shows an example of a conventional O-OFDM signal superimposed on the on-states of PWM pulses.

As discussed above, one key challenge in VLC is to provide a high capacity VLC link 16 while providing proper dimming control to LED luminaire 10. One solution is to combine O-OFDM with PWM dimming. Conventional methods to combine O-OFDM with PWM dimming superimpose the O-OFDM signal onto the PWM signal only during the on-state of the PWM signal. FIG. 2 shows one example of analog O-OFDM signals 30 superimposed during on-states 32 of PWM signals 34 using conventional methods. However, as can be seen, no O-OFDM signals are superimposed during the off-states of the PWM signal, indicated at 36. Such a technique is limited by the relatively low PWM line rate and results in a low capacity VLC link. Additionally, the O-OFDM signals superimposed during the on-states are subject to clipping distortion due to the limited dynamic range of LEDs.

Figure 3:
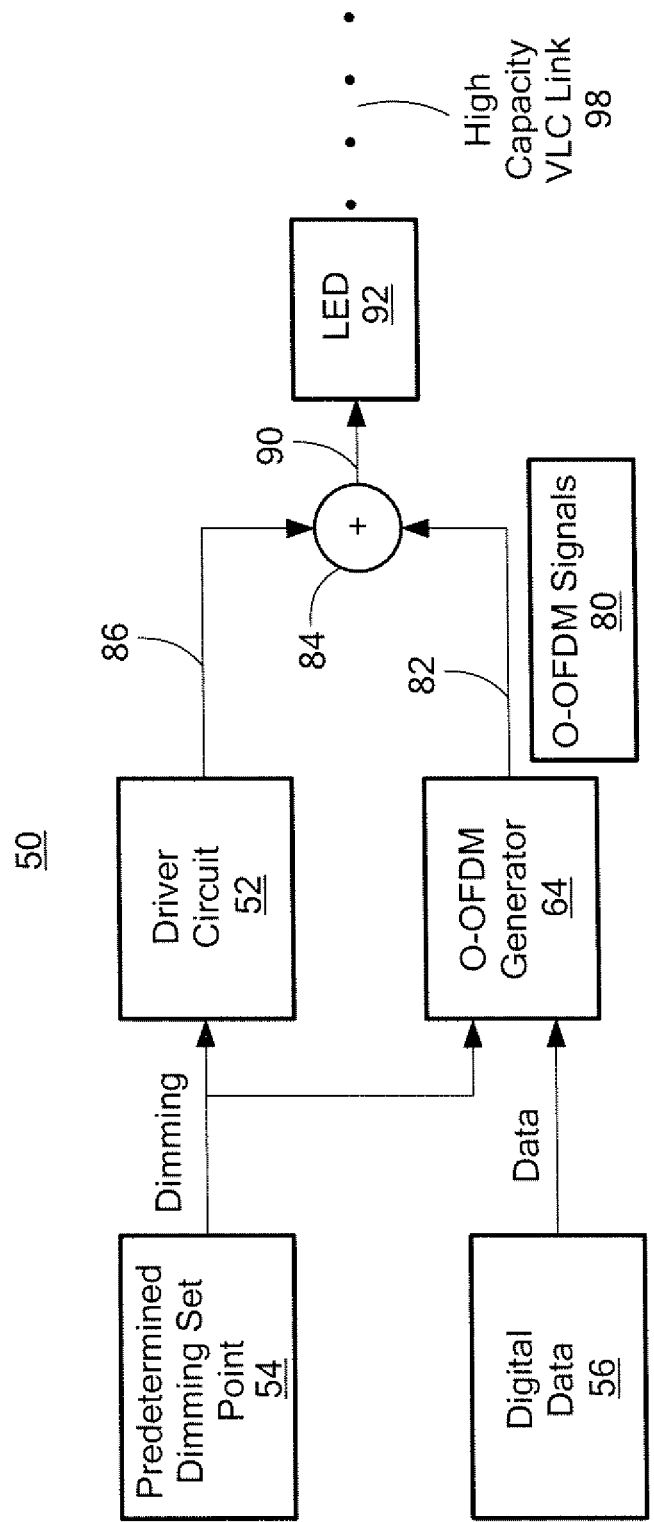
FIG. 3 is a schematic block diagram showing the primary components of one embodiment of the O-OFDM system with PWM dimming of this invention.

O-OFDM system 50, FIG. 3, with PWM dimming of one or more embodiments of this invention efficiently and effectively combines O-OFDM with PWM dimming during both the on-state and off-state of PWM signals to provide a high capacity VLC link and to fully utilize the LED dynamic range to minimize clipping distortion while providing accurate dimming control and wide dimming range to one or more LEDs 92, such as the LEDs of a commercially available LED luminaire 10, FIG. 1.

Figure 4:
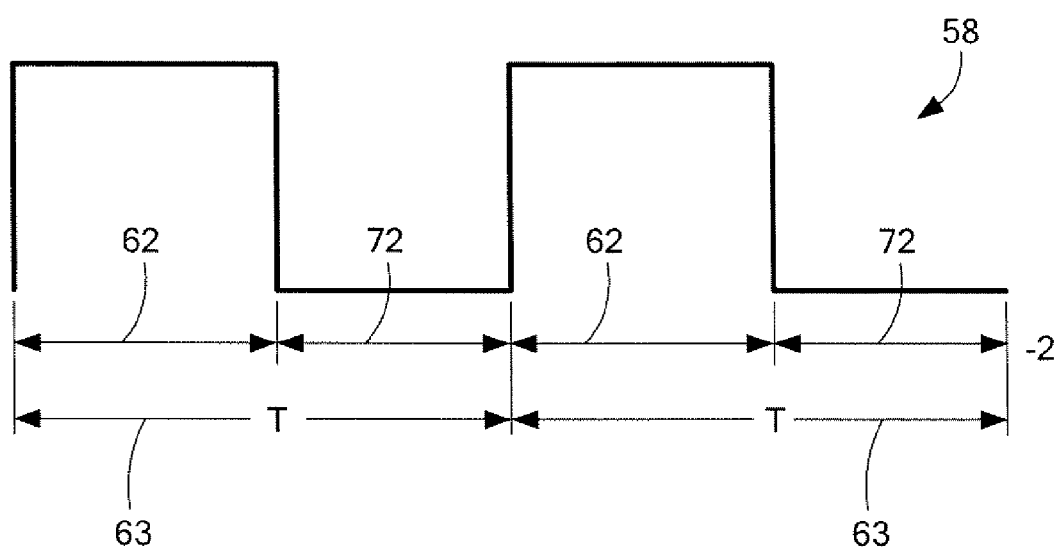
FIG. 4 depicts an example of a PWM signal generated by the driver circuit shown in FIG. 3.

O-OFDM system 50, FIG. 3, with PWM dimming includes driver circuit 52 responsive to one or more predetermined dimming set points 54 as shown. One or more predetermined dimming set points 54 include the desired dimming control for one or more LEDs 92. That is, predetermined dimming set points 54 determine the width, or duration, of the pulses of the PMW signals in relation to the period of the PWM signals (the duty cycle), to determine the illumination level from one or more LEDs 92. Driver circuit 52, FIG. 3, is configured to generate PWM signals having a predetermined duty cycle determined by predetermined dimming set points 54 and supply current to one or more LEDs 92. FIG. 4 shows an example of PWM signal 58 having the predetermined duty cycle defined by the duration of PWM on-state 62 of PWM signal 58 divided by the period of PWM signal 58, indicated at 63.

Figure 5:
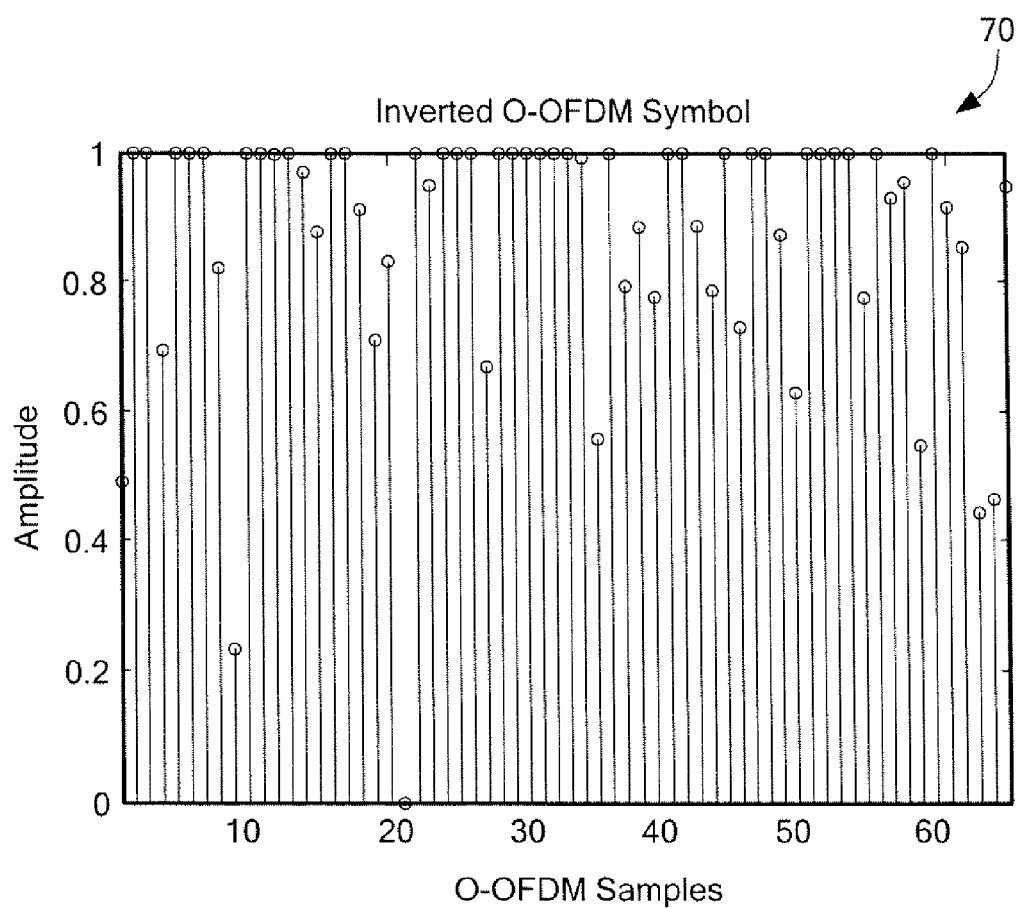
FIG. 5 depicts an example of a digital inverted O-OFDM signal generated by the O-OFDM generator shown in FIG. 3.

O-OFDM system 50, FIG. 3, with PWM dimming also includes O-OFDM generator 64 responsive the one or more predetermined dimming set points 54 and digital data 56 as shown. O-OFDM generator 64 is configured to generate digital inverted O-OFDM signals during on-states of the PWM signals and generate digital non-inverted O-OFDM signals during the off-states of the PWM signals according to the predetermined duty cycle defined by dimming set points 54. For example, during on-states 62, FIG. 4, defined by the predetermined duty cycle, O-OFDM generator 64 generates digital inverted O-OFDM signal 70, FIG. 5, where the circles shown represent discrete digital values of the O-OFDM samples that have been grouped into an inverted O-OFDM symbol (discussed in further detail below). During off-states 72, FIG. 4, also defined by predetermined dimming set points 54, when PWM signal 58 is low, O-OFDM generator generates digital non-inverted O-OFDM signal 74, FIG. 6, where the circles shown represent discrete digital values of the O-OFDM samples that have been grouped into a non-inverted O-OFDM symbol.

Figure 7:
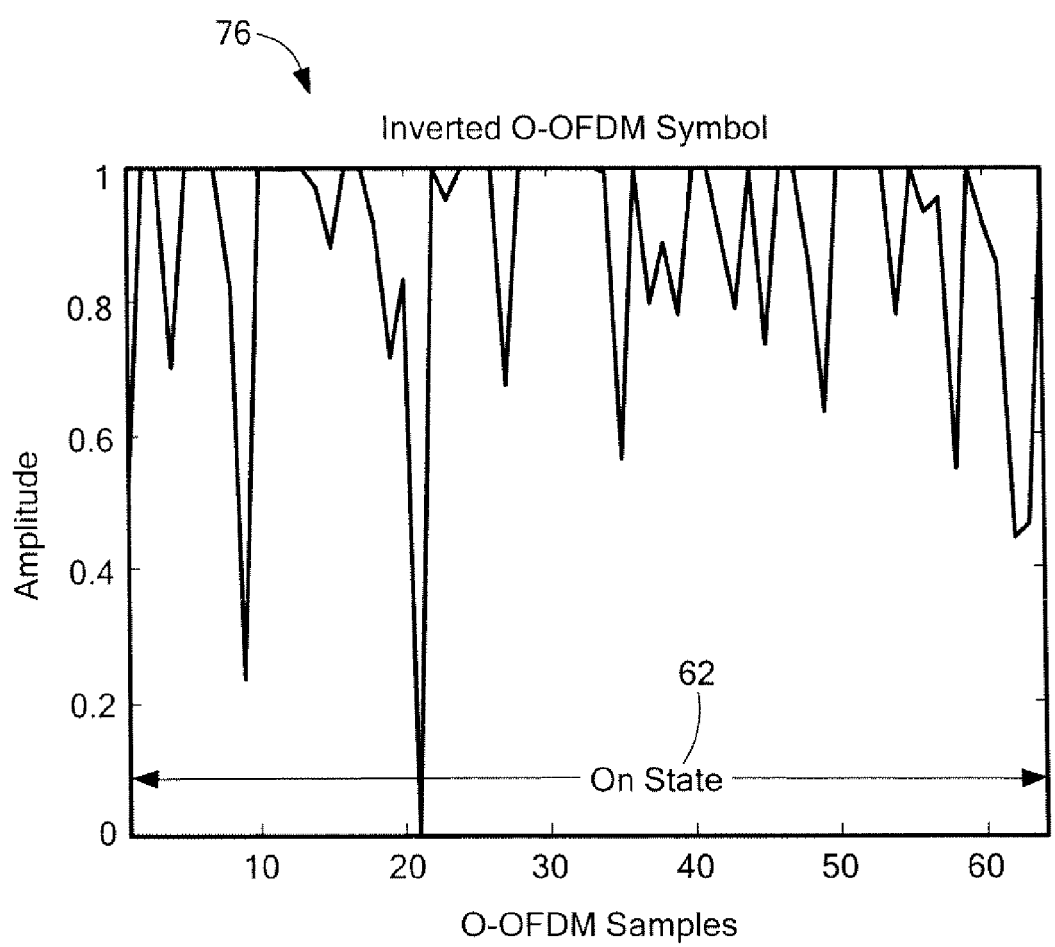
FIG. 7 depicts an example of an analog inverted O-OFDM signal generated by the O-OFDM generator shown in FIG. 3.
Figure 8:
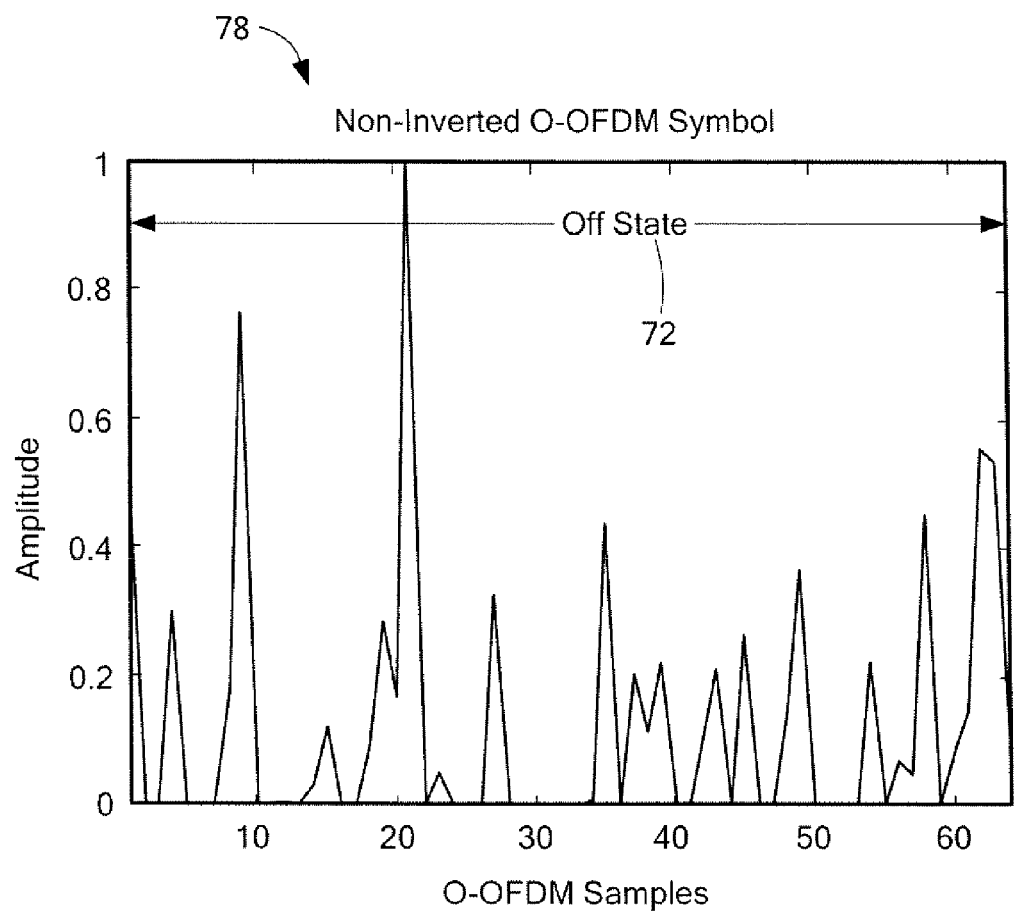
FIG. 8 shows an example of an analog non-inverted O-OFDM signal generated by the O-OFDM generator shown in FIG. 3.
Figure 9:
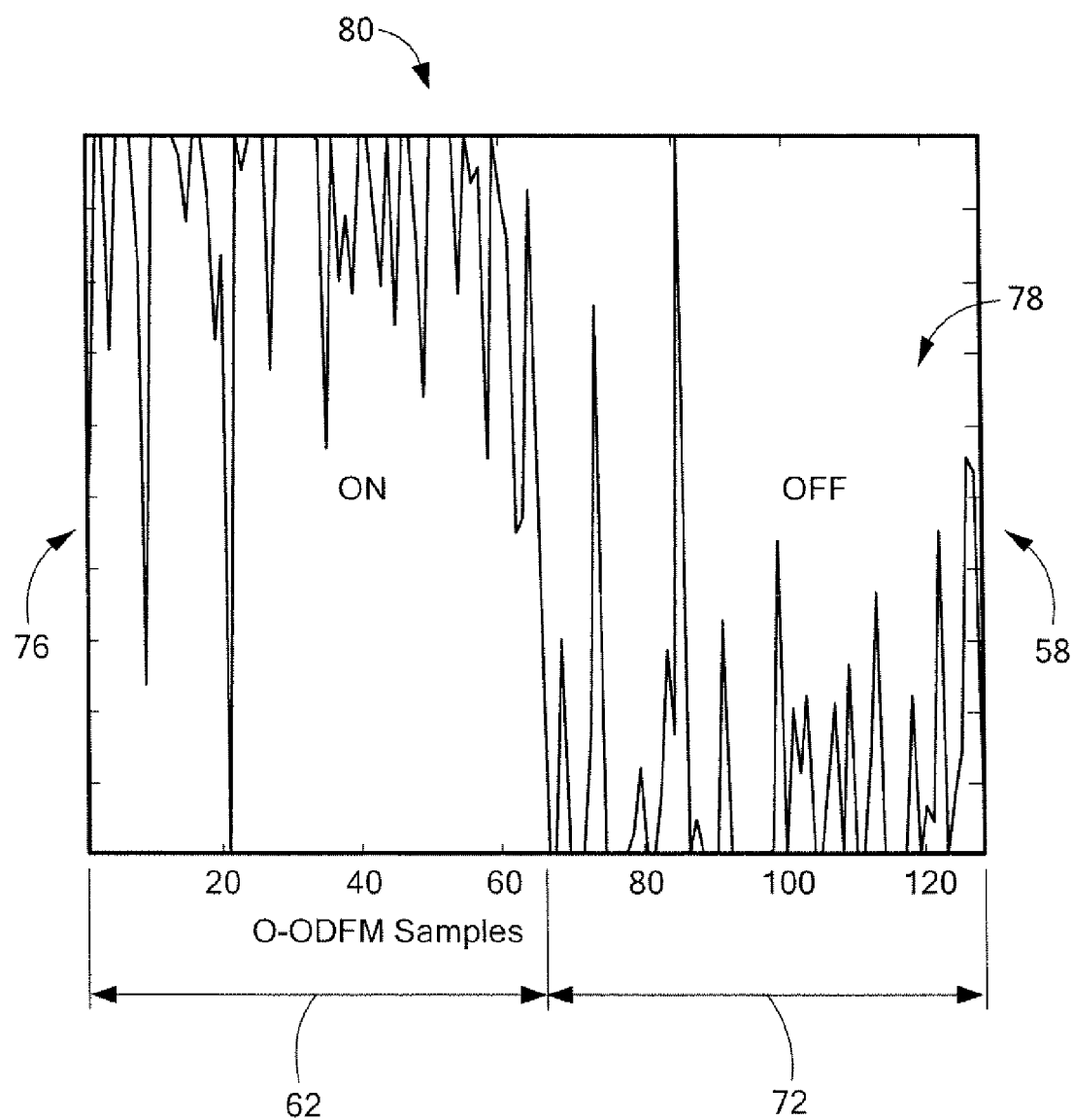
FIG. 9 shows one example of an output analog O-OFDM signal having an inverted analog O-OFDM signal during a high-state of a PWM signal and a non-inverted analog O-OFDM during a low-state of a PWM by the O-OFDM generator shown in FIG. 3.

O-OFDM generator 64, FIG. 3, is further configured to convert the digital inverted O-OFDM signals and the digital non-inverted O-OFDM signals to analog output O-OFDM signals 80 on line 82. FIG. 7 shows a more detailed example of analog inverted O-OFDM signal 76 and FIG. 8 shows a more detailed view of analog non-inverted O-OFDM signal 78. FIG. 9 shows an example of analog output O-OFDM signal 80 with analog inverted O-OFDM signals 76 during high-state 62 of the PWM signal 58 and digital non-inverted O-OFDM signals 78 during off-state 72 of the PWM signal 58.

O-OFDM system 50, FIG. 3, with PWM dimming further includes combiner circuit 84 responsive to the current from the driver circuit 50 by line 86 and analog output O-OFDM signals 80 by line 82 configured such that analog output O-OFDM signals 80 modulate the current to the one or more LEDs 92 to provide high capacity visible light communication link 98. In other words, the load current flowing through LED 92, controlled by driver circuit 52, is modulated by output analog inverted O-OFDM signals 80 on line 82 onto the illumination light generated by LED 92 for different PWM set points provided by predetermined dimming set points 54 while maintaining high capacity VLC link 98.

The result is O-OFDM system 50 with PWM dimming utilizes the whole period of the PWM dimming signal for data transmission instead of limiting transmission to only during the on-state as found in conventional systems and methods. There are no constraints on the frequency or duty cycle of the PWM dimming signal. The quality of the VLC data communication channel is independent of the dimming level and for a wide dimming range. Additionally, the LED dynamic range is fully utilized and the non-linear clipping distortion of the O-OFDM communication signal is minimized. This provides a high capacity VLC link needed for VLC communications and the needed wide range PWM dimming control of LEDs, such as in commercially available LED luminaires.

Figure 6:
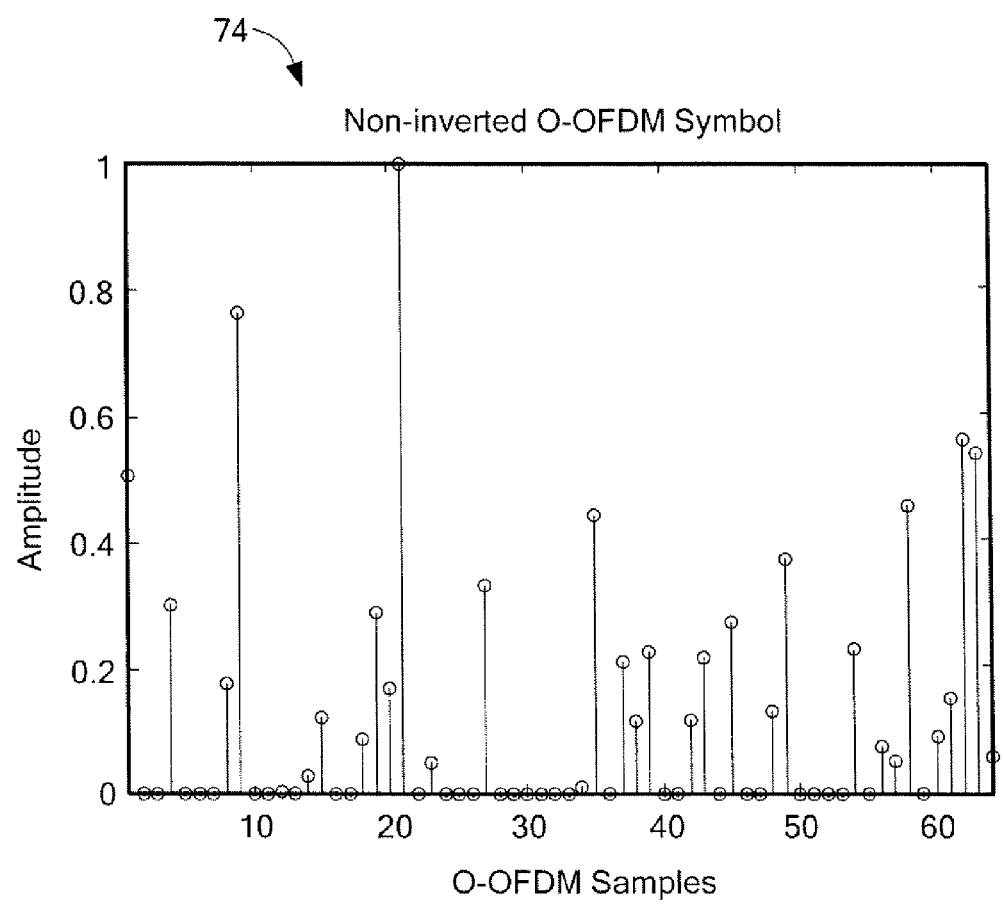
FIG. 6 shows an example of a digital non-inverted O-OFDM signal generated by the O-OFDM generator shown in FIG. 3.
Figure 10:
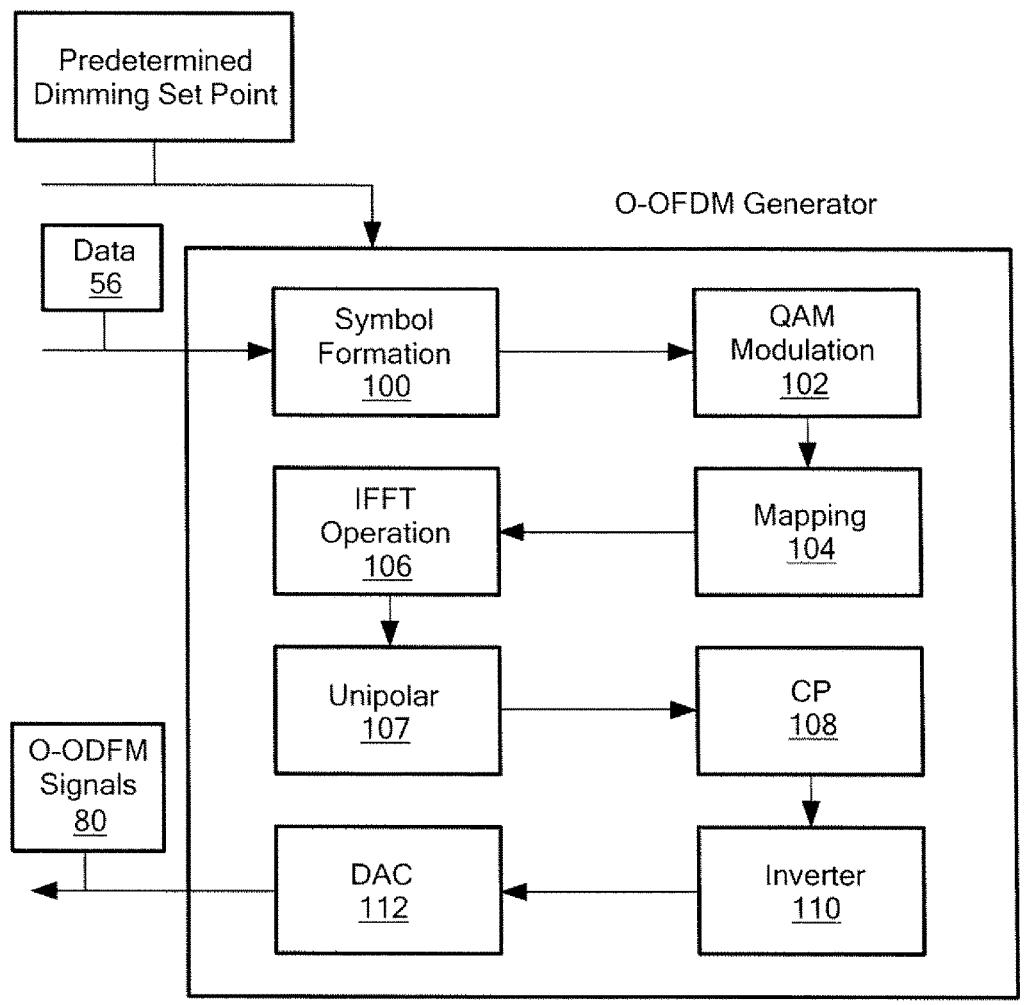
FIG. 10 is a schematic block diagram showing the primary components of one embodiment of the O-OFDM generator shown in FIG. 3.
Figure 11:
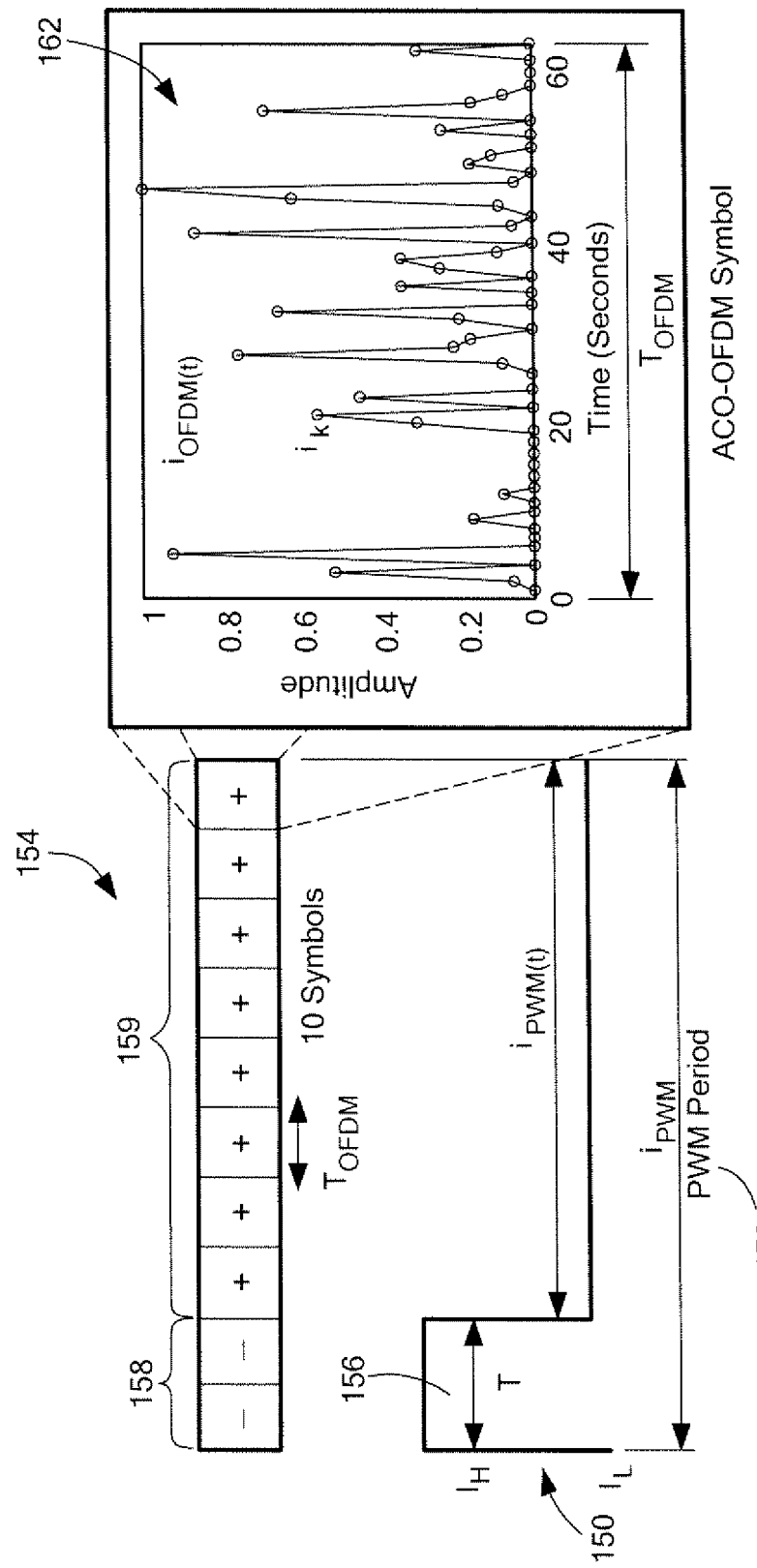
FIG. 11 is a schematic block diagram showing one example of the operation of the inventor of the O-OFDM generator shown in FIG. 10.

In one design, O-OFDM generator 64, FIGS. 1 and 10, includes data symbol formation generator 100, FIG. 10, responsive to a stream of digital data 56. The stream of serial data bits in digital data 56 are preferably grouped into data symbols. The data symbols are modulated by a quadrature amplitude modulation (QAM) modulator 102. Mapper 104 assigns the data symbols to inverted fast Fourier transfer (IFFT) bins (subcarriers). The O-OFDM signals are assembled in the frequency domain and the O-OFDM time domain signals are obtained using 11-FT operation subsystem 106. Unipolar generator 107 preferably generates digital non-inverted unipolar O-OFDM symbols, e.g., as shown in FIG. 6. Fixed length cyclic prefix (CP) 108, to avoid inter-symbol interference (ISI), is preferably added. Preferably, inverter 110 generates the digital inverted O-OFDM signals or symbols during the on-states of the PWM signals based on the predetermined duty cycle determined by dimming set points 54. Inverter 110 preferably inverts a predetermined number of symbols based on the duration of the on states. Inverter 110 is deactivated during the off-states such that O-OFDM generator 64 generates the digital non-inverted O-OFDM signals or symbols during the off-states of the PWM signals based on the predetermined duty cycle. For example, FIG. 11 shows one example of the operation of O-OFDM system 50, FIG. 3, with PWM dimming 50. In this example, the period of PWM signal 150, FIG. 11, is indicated at 152. Using the predetermined duty cycle of PWM signal 150, O-OFDM generator 64, FIG. 3, adjusts the polarity of O-OFDM symbols (inverted O-OFDM symbols) 154 based on the duration, or width, of on-state 156. In this example, two symbols have their polarity reversed, indicated at 158 when invertor 110, FIG. 10, is active. When inverter 110 is inactive, during the off-state of PWM signal 150, indicated at 160, the remaining 8 symbols, indicated at 159, do not have their polarity reversed (non-inverted O-OFDM symbols). For example, a typical asymmetrically clipped O-OFDM (ACO-OFDM) symbol is indicated at 162. Reversing or inverting the polarity of the O-OFDM symbols or signals helps prevent clipping of the O-OFDM signals superimposed on the PWM signals during the on-state.

Digital-to-analog converter 112, FIG. 10, coverts the digital inverted O-OFDM signals and the digital non-inverted O-OFDM signals to analog output O-OFDM signals 80 output by line 82 to combiner circuit 84, FIG. 3.

Figure 12:
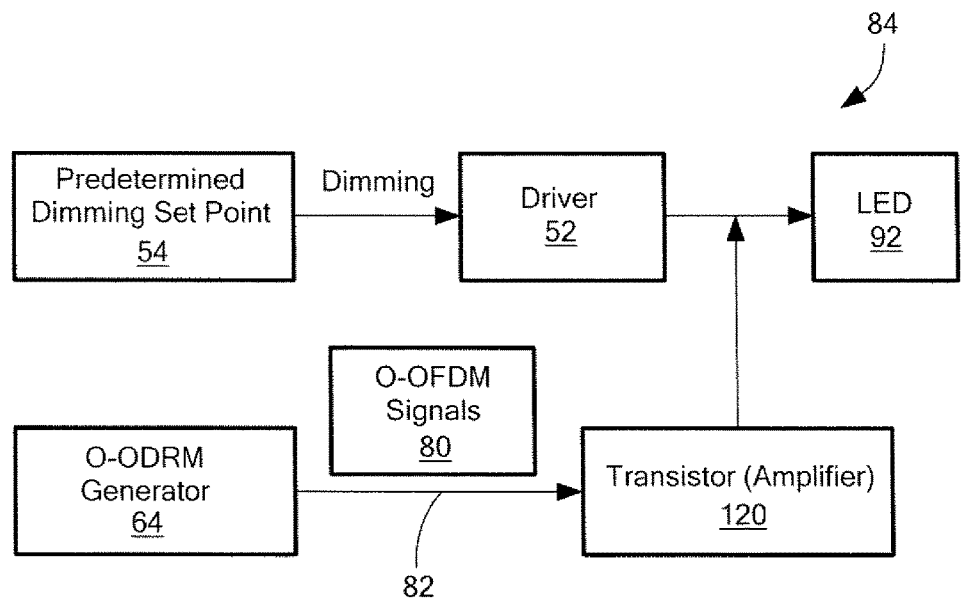
FIG. 12 is a schematic block diagram showing an example of a combiner circuit used to modulate current to the LED shown in FIG. 3 using the O-OFDM signals in accordance with one embodiment of this invention.

In one example, combiner circuit 84, FIG. 3, may include amplifier transistor 120, FIG. 12, where like parts have been given like numbers, configured such that analog output O-OFDM signals 80 modulate the current to the one or more LEDs 92 to provide a high capacity VLC link 98. Amplifier transistor 120 controls the current flowing through LED 92. Amplifier transistor 120 essentially functions as a valve. The valve is controlled by analog output O-OFDM signals 80 generated according the predetermined dimming set point 54.

Figure 13:
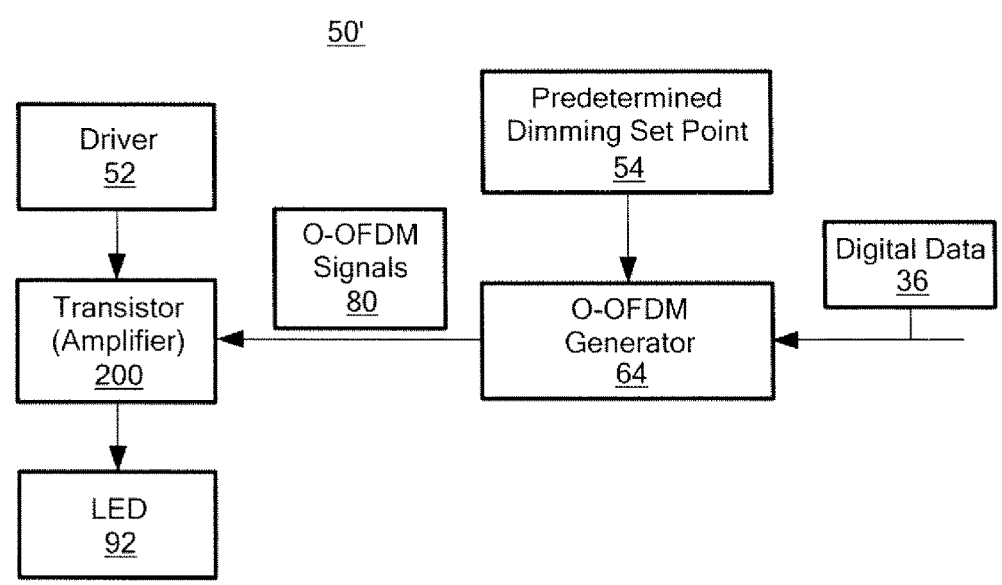
FIG. 13 is a schematic block diagram of one embodiment of modulating the LED current supplied by the driver circuit using the analog output O-OFDM signals generated by the O-OFDM generator.
Figure 14:
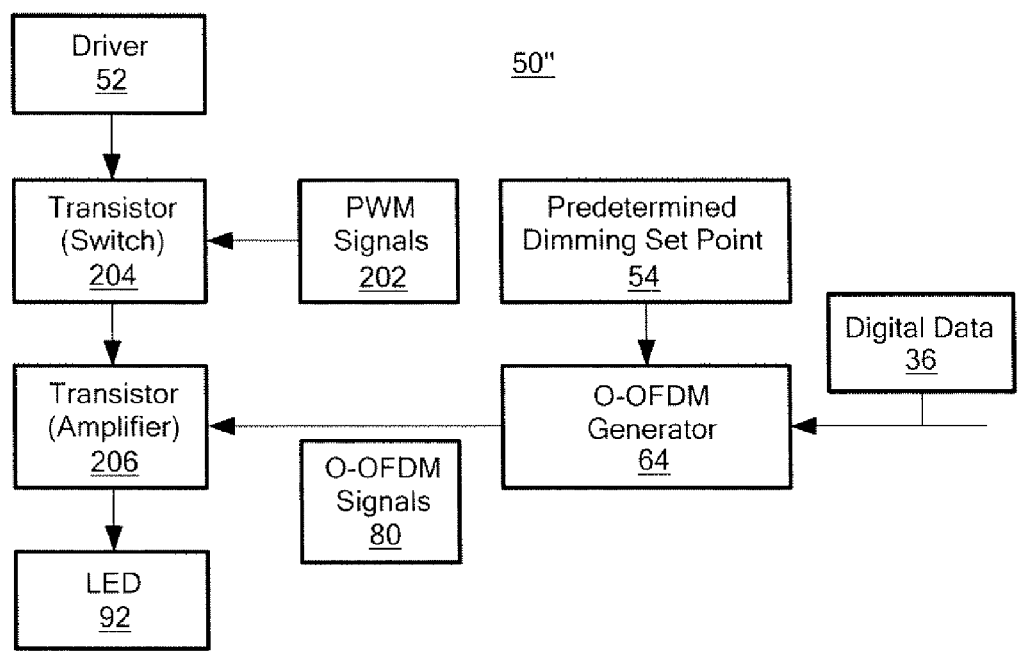
FIG. 14 is a schematic block diagram of another embodiment of combining PWM dimming signals and analog output O-OFDM signals to modulate the LED current according to the PWM dimming set point.

Although as discussed above, combiner circuit 84, FIG. 3, is configured such that the analog output O-OFDM signals 82 modulate current to the one or more LEDs 92 to provide a high capacity VLC link, this is not a necessary limitation of this invention. In one embodiment, O-OFDM system 50' with PWM, FIG. 13, where like parts have been given like numbers, modulates the LED current supplied by driver circuit 52 and analog output O-OFDM signals 80 input to amplifier transistor 200 according to one or more predetermined dimming set points 54. In another design, O-OFDM system 50" with PWM, FIG. 14, where like parts have been given like numbers, combines the PWM dimming signals 202 input to switching transistor 204 and the analog output O-OFDM signals 80 input to transistor amplifier 206 to modulate the LED current input to one or more LEDs 92 according to predetermined dimming set point 54.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. An optical orthogonal frequency division multiplexing (O-OFDM) system with pulse-width modulation (PWM) dimming, the system comprising:
   a driver responsive to one or more predetermined dimming set points configured to generate PWM signals having a predetermined duty cycle and configured to supply current to one or more light emitting diodes (LEDs);
   an O-OFDM generator responsive to the one or more predetermined dimming set points and digital data configured to generate digital inverted O-OFDM signals during on-states of the PWM signals and non-inverted O-OFDM signals during off-states of the PWM signals according to the predetermined duty cycle and convert the digital inverted O-OFDM signals and the digital non-inverted O-OFDM signals to analog output O-OFDM signals; and
   a combiner circuit responsive to the current from the driver and the analog output O-OFDM signals configured such that the analog output O-OFDM signals modulate the current to the one or more LEDs to provide a high capacity visible light communication link.

2. The system of claim 1 in which the O-OFDM generator includes an inverter configured to generate the digital inverted O-OFDM signals during the on-states based on the predetermined duty cycle.

3. The system of claim 1 in which the O-OFDM generator includes a digital to-analog converter for converting the digital inverted O-OFDM signals and the digital- non-inverted O-OFDM signals to the analog output O-OFDM signals.

4. The system of claim 1 in which the combiner circuit includes at least one amplifier transistor configured such that the analog output O-OFDM signals modulate the current to the one or more LEDs to provide the high capacity visible light communication link.

5. The system of claim 1 in which the combiner circuit includes at least one amplifier transistor and at least one switching transistor configured such that the analog output O-OFDM signals modulate the current to the one or more LEDs to provide the high capacity visible light communication link.

6. The system of claim 2 in which the digital inverted O-OFDM signals include a steam of O-OFDM symbols.

7. The system of claim 1 in which the digital non-inverted O-OFDM signals include a steam of O-OFDM symbols.

8. The system of claim 6 in which the inverter is configured to invert a predetermined number of O-OFDM symbols based on the predetermined duty cycle.

9. The system of claim 6 in which the inverter is configured to invert a predetermined number of O-OFDM symbols based on duration of the on-states.

10. The system of claim 1 in which the O-OFDM generator is configured to generate unipolar inverted O-OFDM symbols during the on-states.

11. The system of claim 1 in which the O-OFDM generator is configured to generate unipolar non-inverted O-OFDM symbols during the off-states.

12. The system of claim 1 in which the one or more LEDs are integrated with a luminaire.

13. An optical orthogonal frequency division multiplexing (O-OFDM) method with PWM dimming, the method comprising:
    providing one or more predetermined dimming set points and digital data;
    generating, in response to the one or more predetermined dimming set points, PWM signals having a predetermined duty cycle;
    generating, in response to the predetermined duty cycle and the digital data, digital inverted O-OFDM signals during on-states of the PWM signals and non-inverted O-OFDM signals during off-states of the PWM signals;
    converting the digital inverted O-OFDM signals and the digital non-inverted O-OFDM signals to analog output O-OFDM signals; and
    modulating the current to the one or more LEDs using the analog output O-OFDM signals to provide a high capacity visible light communication link.

14. The method of claim 13 in which generating the digital inverted O-OFDM includes generating the digital inverted O-OFDM signals during the on-states based on the predetermined duty cycle.

15. The method of claim 13 in which generating the digital inverted O-OFDM signals includes generating a steam of O-OFDM symbols.

16. The method of claim 13 in which generating digital non-inverted O-OFDM signals includes generating a steam of O-OFDM symbols.

17. The method of claim 15 in which combining the digital inverted O-OFDM signals with the PMW signals during the on-states includes inverting a predetermined number of O-OFDM symbols based on the predetermined duty cycle.

18. The method of claim 15 in which combining the digital inverted O-OFDM signals with the PMW signals during the on-states includes inverting a predetermined number of O-OFDM symbols based on duration of the on-states.

19. The method of claim 13 further including generating unipolar inverted O-OFDM symbols during the on-states.

20. The method of claim 13 further including generating unipolar non-inverted O-OFDM symbols during the off-states.

21. The method of claim 13 in which the one or more LEDs are integrated with a luminaire.

* * * * *